LE ROY C. CAMERON.
CONTROL MECHANISM FOR MOTOR VEHICLES.
APPLICATION FILED DEC. 9, 1918.

1,403,390.

Patented Jan. 10, 1922.
3 SHEETS—SHEET 3.

Inventor
LeRoy C. Cameron

Witness
L. S. Woodhull

By B. J. Wheeler
Attorney

UNITED STATES PATENT OFFICE.

LE ROY C. CAMERON, OF DETROIT, MICHIGAN.

CONTROL MECHANISM FOR MOTOR VEHICLES.

1,403,390.  Specification of Letters Patent.  Patented Jan. 10, 1922.

Application filed December 9, 1918. Serial No. 265,379.

*To all whom it may concern:*

Be it known that I, LE ROY C. CAMERON, a citizen of the United States, residing at Detroit, in the county of Wayne, State of Michigan, have invented a new and useful Control Mechanism for Motor Vehicles, of which the following is a specification.

This invention relates to control mechanism for motor vehicles, and more particularly to mechanisms for controlling the engine speed and the movement of the vehicle automatically.

It is the object of the invention to improve the control of a motor vehicle by providing simple and efficient means to synchronize the action of the several separate control mechanisms commonly employed, and to simplify the operation of such control by combining the means for checking or starting and stopping the vehicle with that for controlling the engine in a single control member.

A further object is to provide a mechanism adapting the engine throttle, clutch and brakes to be controlled in common, and yet allow control of these three devices to be exercised independently in the manner ordinarily intended for their separate control.

In attaining these objects the invention contemplates maintaining a supply of compressed air upon a motor vehicle for use primarily in actuating a pneumatic motor exercising control over the clutch and brake pedals, said motor being controlled by a valve which is actuable by the engine throttle control mechanism.

A preferred embodiment of the invention is illustrated in the accompanying drawings, wherein, Fig. 1 is a plan view of the chassis of a motor vehicle provided with the herein-described control mechanism.

Figure 1:
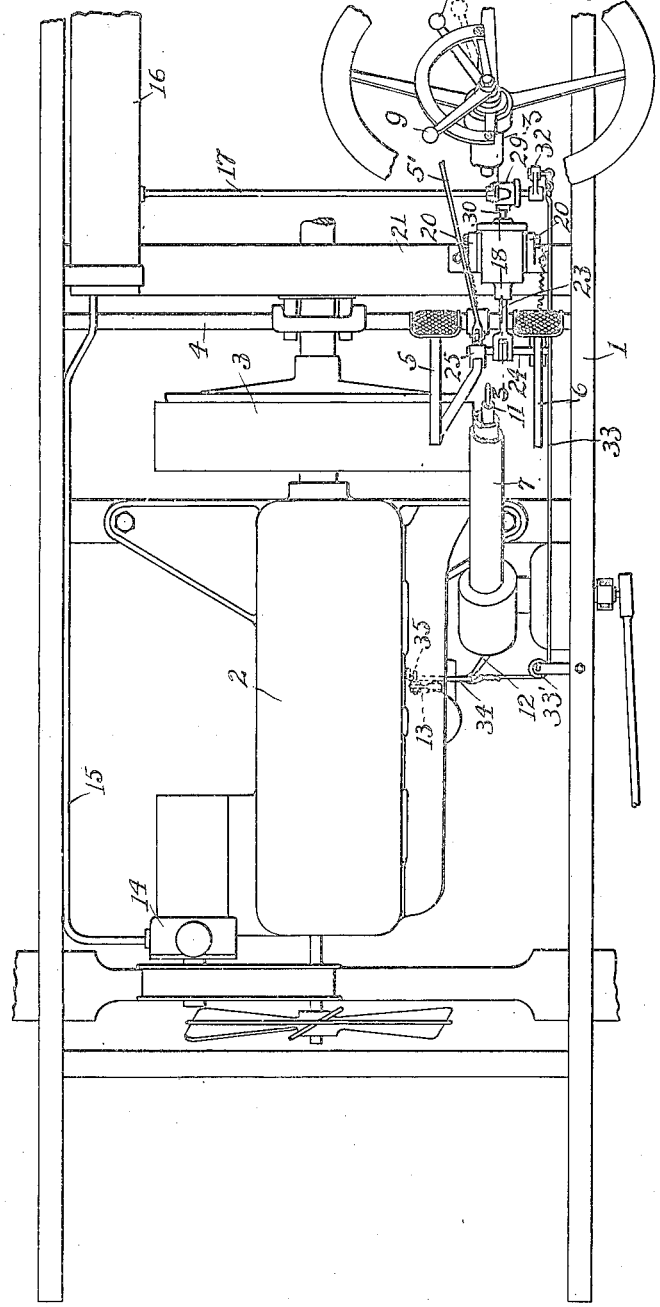
Figure 2:
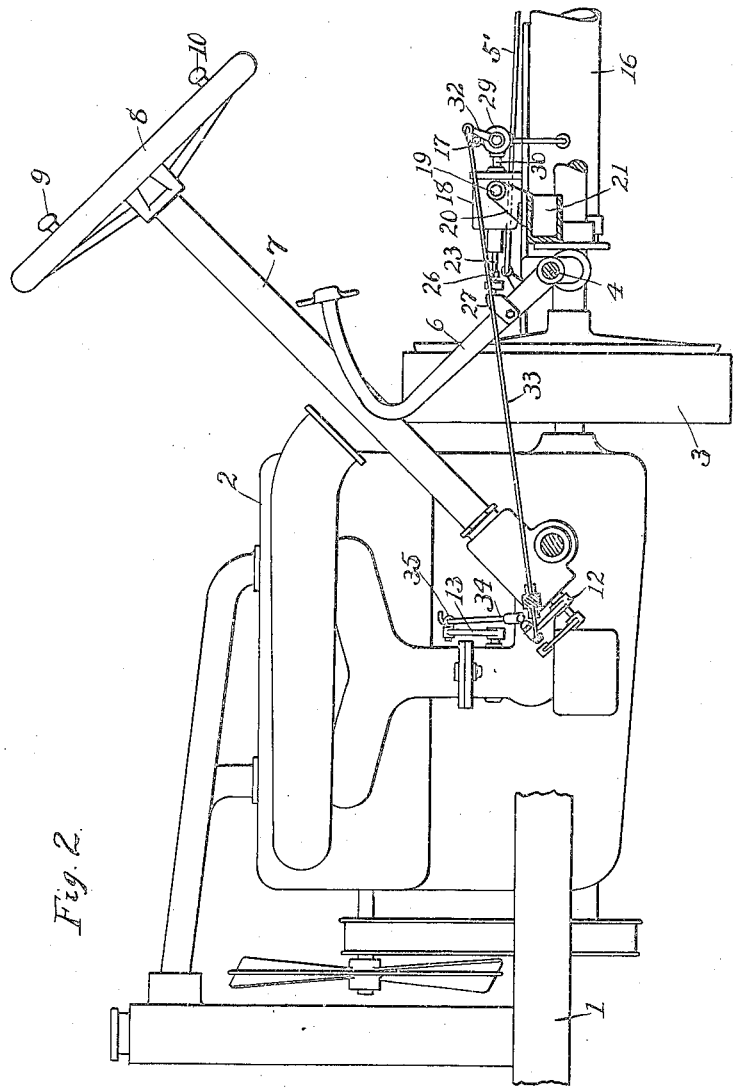
Fig. 2 is a view in side elevation of the engine and control mechanism for the same and for the motor vehicle.
Figure 3:
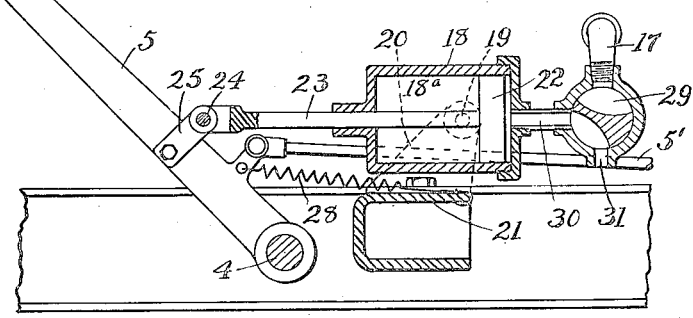
Fig. 3 is a vertical sectional view of the pneumatic motor with its control valve and the pedal-actuating connections, the section being taken on line 3—3 of Fig. 1.
Figure 4:
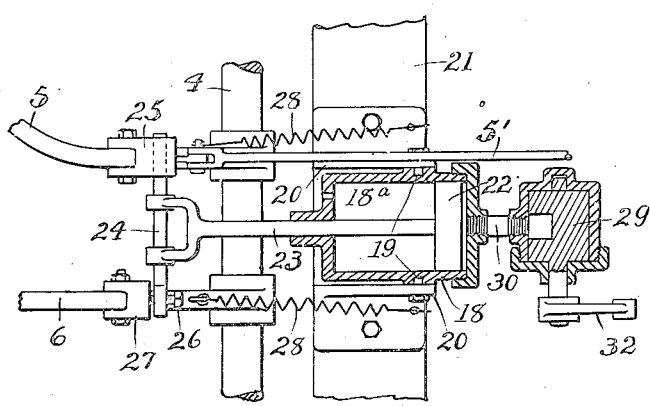
Fig. 4 is a view of the same parts in horizontal section.

Referring now in detail to the drawings, the reference character 1 designates the frame of a motor vehicle, 2 the engine, 3 the clutch, 4 the rock shaft through which the clutch is actuated, 5 and 6 the brake and clutch pedals mounted respectively loose and fast upon said shaft, 5′ the brake rod extending rearwardly from the pedal 5 to the brakes (not shown), 7 the steering column, 8 the steering wheel, 9 and 10 the spark and throttle control levers, and 11 the sleeve within the column 7 which is adapted to be rocked by the lever 10, and which carries upon its lower end an arm 12 for actuating the throttle arm 13. These parts are common to practically all motor vehicles, but the features which will now be described comprise the present invention and are believed to be novel.

Compressed air, which is preferably employed as a motive medium, may be supplied by a pump indicated at 14 driven by the engine 2 in any suitable manner, and is conducted by a pipe 15 to a storage tank 16. A pipe 17 extends from said tank to supply motive power to a pneumatic motor 18 having a pair of trunnions 19 by which it is mounted in a pair of brackets 20 surmounting a cross bar 21 of the frame. A piston 22 within the cylinder 18$^a$ of said motor has a rod 23 extending forwardly therefrom, which rod is forked at its outer end and pivotally engaged with a transverse bar 24. At one end the bar 24 is mounted fast in a bracket 25 carried by the brake controlling pedal 5, while its other end carries an adjusting screw 26 bearing upon a bracket 27 carried by the clutch controlling pedal 6 but having no fixed connection with said bracket. The usual springs tending to retract the pedals 5 and 6 to their normal raised positions are indicated at 28. The air supply to the pneumatic motor 18 is controlled by a three-way valve 29 which in one position connects the supply pipe 17 with a nipple 30 opening into the cylinder 18$^a$, and in another position connects said nipple with an exhaust port 31. For actuating said three-way valve to admit air to the pneumatic motor the same is provided with a rock-arm 32, from which a cable or wire 33 is extended forwardly around a suitable guide roller 33' to the arm 12. The arrangement is such that ordinary manipulation of the throttle controlling lever 10 to open or close the throttle has no effect on the valve 29, the former movement serving to slacken the cord 33 and the latter to take up the slack therein. If, however, the lever 10 be shifted beyond its normally retarded position in which the engine is running idle, the resultant rotation of the sleeve 11 and the arm 12, exerts a pull through the cord 33 upon the rock-arm 32 of the valve such as to shift the same from its normal position venting the motor 18 to a position admitting air thereto. The piston 22 and rod 23 are thereby moved forwardly and the latter acts through the bar 24 to force the pedals 5 and 6 to their forward or lowered positions wherein the clutch is ineffective or out and the brakes are applied to the vehicle.

Obviously it is necessary to provide a certain amount of lost motion in the connection between the arm 12 and throttle arm 13, since the latter must remain stationary during the movement of the lever 10 to and from its dash line position in Fig. 1. This result is achieved by establishing the desired connection through a link 34 having at one end an ordinary pivotal connection with the arm 12 while its other end is passed through an eye 35 carried by the arm 13 and is hooked to prevent withdrawal from said eye. The arrangement is such that said link may slip freely through the eye 35 while the lever 10 is being shifted between the full line and dash line positions shown in Fig. 1, while upon an adjustment of said lever in the other direction from its full line position the hook of the link 34 engages the eye 35 and the throttle is opened to a degree corresponding to movement of said lever.

It is to be noted that the above-described control mechanism does not interfere with foot control of the clutch pedal 6 in the ordinary manner so that for purposes not requiring an application of the brakes or an adjustment of the throttle, as when the gears are to be shifted for a change of speed the clutch pedal may be pressed down quite independently of the throttle and brake control mechanisms.

The adjusting screw 26 is provided as a bearing for the bar 24 upon the bracket 27 for the reason that some adjustment is necessary in order to insure that forward movement of said bar 24 will first cause the clutch 3 to be released and will then effect an application of the brakes.

It will be evident that operation of a motor car is greatly simplified by thus synchronizing the action of the several control devices, making it more convenient and easy for a beginner to acquire ability to drive a car, and making control of a car possible for those who lack sufficient mechanical instinct to properly manipulate the various control devices independently. Furthermore, the operator is relieved of much of the muscular effort involved in actuating the clutch and brake pedals in the ordinary manner, so that a person of comparatively weak physique is enabled by the invention to safely and effectively operate a car without difficulty or undue exertion.

The presence of the supply of compressed air in the tank 16 not only provides motive power for shifting the control pedals but is further advantageous in making possible inflation of the tires of the vehicle without appreciable labor.

What I claim is:

1. In a control mechanism for motor vehicles, the combination with the engine throttle, the clutch and the brake of a motor vehicle, of a lever for actuating the throttle, pedals for actuating the clutch and brake, and supplementary mechanism for actuating the clutch and brake controlled through said lever, and including means for varying the timed relation in which the clutching and braking are effected.

2. In a control device for motor vehicles, the combination with the engine throttle, clutch and brakes of a motor vehicle, of a lever for actuating the throttle, pedals for actuating the clutch and brake, and supplementary mechanism for actuating the clutch and brake controlled through said lever and including means for varying the timed relation in which the clutching and braking are effected, the clutch control by its pedal being independent of said mechanism.

3. In a vehicle control mechanism, the combination with the engine throttle, the clutch and the brakes of a motor vehicle, of a lever for actuating the throttle, pedals for actuating the clutch and brake and supplementary mechanism for actuating the clutch and brake controlled through said lever, and including means for varying the timed relation in which the clutching and braking are effected.

4. In a vehicle control mechanism, the combination with the engine throttle, clutch and brakes of a motor vehicle, of a lever for actuating the throttle, pedals for actuating the clutch and brake, a pneumatic motor forming a supplementary actuating means for the clutch and brake, a bar movable by said motor having positive engagement with the brake pedals at one end and abutting against the clutch pedal at the other, an air supply for said motor, a control valve for the motor and a common means for controlling said valve from the throttle lever.

5. In a control mechanism for motor vehicles, the combination with the engine throttle, the clutch and brake and the steering post of a motor vehicle, of a lever mounted on said steering post for controlling the throttle, a lost motion mechanism for actuating the throttle from said lever affording a movement of the latter beyond its idling position independently of the throttle, and a lost motion mechanism for controlling the clutch and brake unaffected by normal movement of the throttle lever but operable upon movement thereof beyond its idling position.

In testimony whereof I sign this specification.

LE ROY C. CAMERON.